(12) United States Patent
Guo et al.

(10) Patent No.: US 12,049,425 B1
(45) Date of Patent: Jul. 30, 2024

(54) WATER-ADAPTIVE CEMENT SELF-HEALING SYSTEM, PREPARATION METHOD AND APPLICATION THEREOF

(71) Applicant: Tianjin University, Tianjin (CN)

(72) Inventors: Jintang Guo, Tianjin (CN); Yujie Ying, Tianjin (CN); MiaoMiao Hu, Tianjin (CN); Ming Liu, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/456,661

(22) Filed: Aug. 28, 2023

(51) Int. Cl.
| | |
|---|---|
| *C04B 20/00* | (2006.01) |
| *C04B 14/04* | (2006.01) |
| *C04B 14/06* | (2006.01) |
| *C04B 14/10* | (2006.01) |
| *C04B 20/10* | (2006.01) |
| *C04B 22/06* | (2006.01) |
| *C04B 22/10* | (2006.01) |
| *C04B 24/12* | (2006.01) |
| C04B 103/40 | (2006.01) |

(52) U.S. Cl.
CPC ........ *C04B 20/0004* (2013.01); *C04B 14/043* (2013.01); *C04B 14/062* (2013.01); *C04B 14/104* (2013.01); *C04B 20/1037* (2013.01); *C04B 20/1048* (2013.01); *C04B 22/06* (2013.01); *C04B 22/10* (2013.01); *C04B 24/123* (2013.01); *C04B 2103/40* (2013.01)

(58) Field of Classification Search
CPC . C04B 20/0004; C04B 14/043; C04B 14/062; C04B 14/104; C04B 20/1037; C04B 20/1048; C04B 22/06; C04B 22/10; C04B 24/123; C04B 2103/40

USPC .......................................................... 523/207
See application file for complete search history.

(56) References Cited

U.S. PATENT DOCUMENTS

2023/0295044 A1\* 9/2023 Hu .......................... C04B 26/14
523/400

FOREIGN PATENT DOCUMENTS

CN 114716178 A 7/2022

OTHER PUBLICATIONS

CNIPA, Notification of a First Office Action for CN202310628841. 6, Jul. 3, 2023.
Tianjin University (Applicant), Reply to Notification of a First Office Action for CN202310628841.6, Jul. 10, 2023.
(Continued)

*Primary Examiner* — David T Karst
(74) *Attorney, Agent, or Firm* — Zhigang Ma (57) ABSTRACT

A water-adaptive cement self-healing system, a preparation method and an application thereof are provided. A pH-triggered shell curing agent, an inorganic nano-emulsifier, and a polysaccharide shell material are added into deionized water to obtain an aqueous phase; an active diluent of epoxy is added to an epoxy to obtain a first oil phase; the aqueous phase is mixed with the first oil phase to obtain an oil/water emulsion; a surfactant is added into paraffin oil to obtain a second oil phase; the second oil phase is mixed with the oil/water emulsion to obtain an oil/water/oil emulsion; an acidic liquid is added into the oil/water/oil emulsion drop-wise to obtain a solid, followed by centrifuging, washing, and freeze-drying to obtain a self-healing capsule; and then an epoxy curing agent is mixed with the self-healing capsule to obtain the water-adaptive cement self-healing system based on an oil/water/oil double-emulsion template.

7 Claims, 12 Drawing Sheets

(56) References Cited

OTHER PUBLICATIONS

Tianjin University (Applicant), Supplemental Reply to Notification of a First Office Action for CN202310628841.6, w/ (allowed) replacement claims, Jul. 11, 2023.
CNIPA, Notification to grant patent right for invention in CN202310628841.6, Jul. 14, 2023.

* cited by examiner

WATER-ADAPTIVE CEMENT SELF-HEALING SYSTEM, PREPARATION METHOD AND APPLICATION THEREOF

TECHNICAL FIELD

The disclosure relates to the technical field of cement self-healing, particularly to a water-adaptive cement self-healing system based on an oil-water-oil double-emulsion template and a preparation method and an application thereof.

BACKGROUND

Well cementing engineering is a key link between well drilling and subsequent mining, a cement ring formed in the well cementing has functions of supporting a protective sleeve, isolating a production area from an unproduction area, and a sealing integrity of the cement ring used in the well cementing is a key to ensure the well cementing quality. However, a cement gelatin material has a poor deformation capability and a low tensile strength. Under a complex well environment and an external impact load, the cracking of a structure made of the cement gelatin material is extremely prone to occur, which causes interlayer sealing failure, and seriously threatens long-term safe production. Due to that the crack of the cement ring is located at a special position, conventional repair means, such as spraying or injecting chemical encapsulants, are difficult to implement, and such the conventional means are expensive, and cannot guarantee the repair efficiency. Therefore, it is of great significance to research and develop a self-healing material suitable for complex downhole environments.

In addition, microcapsules have an advantage of diversity of encapsulation materials, so that it is possible to select different materials according to actual situations to meet different engineering requirements, and the microcapsules are widely applied to self-healing of cement-based materials. Li, et al. successfully prepared a styrene maleic anhydride (SMA)/gelatin-epoxy self-healing microcapsule by complex coacervation. Research results show that the self-healing microcapsule can realize the self-healing of the cement-based material by mechanical triggering (with reference to a literature: Li WT, Wei Q, Chen Q, et al. Microencapsulation and evaluation of styrene maleic anhydride/epoxy for mechanical triggering self-healing of cementitious materials [J]. Cement Concr Compos, 2021, 124: 104247). Sun et al. prepared dimethyl thio-toluene diamine (DMTDA) microcapsules and research results found that through adding the DMTDA microcapsules, the cracks of cement-based material with size less than 100 micrometers (μm) are repaired and the mechanical properties are recovered (with reference to a literature: Sun D, Wenxu M, Jikun M, et al. The synthesis of DMTDA microcapsules and investigation of self-healing cement paste through an isocyanate-amine system [J]. Cem Concr Compos, 2021, 122: 104132). However, in practical application, a shearing force generated by high-speed stirring in the cement mixing process can influence the integrity of the self-healing capsule, and the capsule is easily broken, so that the self-healing efficiency is affected. Furthermore, the synthesis process of existing self-healing capsule often includes steps of heating, adding initiator, copolymerizing multi-monomer, etc., which needs long time for synthesis, costs much, and cannot meet requirements for industrialization.

SUMMARY

An objective of the disclosure is to provide a water-adaptive cement self-healing system to solve disadvantages that an existing cement self-healing system is easy to shear and crack in a slurry mixing process and is low in a self-healing rate.

Another objective of the disclosure is to provide a method for preparing the water-adaptive cement self-healing system.

Still another objective of the disclosure is to provide an application method of the water-adaptive cement self-healing system in cement self-healing.

In order to achieve the above objectives of the disclosure, technical solutions are adopted as follows.

A method for preparing the water-adaptive cement self-healing system includes the following steps:

step 1, preparation of a self-healing capsule, including the following steps:

step A1, preparation of an aqueous phase, including: adding a potential of hydrogen (pH)-triggered shell curing agent, an inorganic nano-emulsifier, and a polysaccharide shell material into deionized water, and then uniformly stirring to obtain the aqueous phase with a mass fraction of the pH-triggered shell curing agent being 18.7%-37.4%, a mass fraction of the inorganic nano-emulsifier being 2.0%-8.0%, and a mass fraction of the polysaccharide shell material being 0.5%-2.0%;

step A2, preparation of a first oil phase, including: adding an active diluent of epoxy to an epoxy, and then uniformly stirring to obtain the first oil phase with a mass fraction of the active diluent of epoxy being 10%-20%;

step A3, preparation of an oil/water emulsion, including: mixing the aqueous phase obtained in the step A1 and the first oil phase obtained in the step A2 according to a volume ratio of 80-50:20-50 to obtain a first mixture, and stirring the first mixture at 10,000-12,000 revolutions per minute (rpm) to obtain the oil/water emulsion;

step A4, preparation of a second oil phase, including: adding a surfactant into paraffin oil, and then uniformly stirring to obtain the second oil phase with a mass fraction of the surfactant being 50%-62.5%;

step A5, preparation of an oil/water/oil emulsion, including: mixing the second oil phase obtained in the step A4 and the oil/water emulsion obtained in the step A3 according to a volume ratio of 80-75:20-25 to obtain a second mixture, and stirring the second mixture at 600-800 rpm to obtain the oil/water/oil emulsion; and step A6, preparing the self-healing capsule, including: dropwise adding an acidic liquid into the oil/water/oil emulsion obtained in the step A5 to obtain a mixed solution, stirring the mixed solution until the mixed solution is shaped to obtain a solid, centrifuging the solid, and then washing the centrifuged solid with deionized water, followed by freeze-drying the washed solid to obtain the self-healing capsule in a core-shell structure, a shell material of which is the aqueous phase prepared in the step A1, and a core material of which is the first oil phase prepared in the step A2; and step 2, mixing an epoxy curing agent with the self-healing capsule prepared in the step 1 according to a mass ratio of (0.5-1):1 to obtain the water-adaptive cement self-healing system based on an oil/water/oil double-emulsion (also referred to oil-in-water-in-oil emulsion) template.

In an embodiment, in the step A1, the pH-triggered shell curing agent is selected from the group consisting of a disodium calcium ethylenediaminetetraacetate, a calcium carbonate, and an aluminum hydroxide.

In an embodiment, in the step A1, the inorganic nano-emulsifier is selected from the group consisting of a nano-silica, a bentonite, and a calcium silicate.

In an embodiment, in the step A1, the polysaccharide shell material is selected from the group consisting of a sodium alginate and a xanthan gum.

In an embodiment, in the step A2, the active diluent of epoxy is selected from the group consisting of a benzyl glycidyl ether, a trimethylolpropane triglycidyl ether, and a 1,4-butanediol diglycidyl ether.

In an embodiment, in the step A4, the surfactant is selected from the group consisting of a span 80, a polysorbate 20, and an op-10 surfactant.

In an embodiment, in the step A6, the acidic liquid is selected from the group consisting of glacial acetic acid, diluted hydrochloric acid, and diluted sulfuric acid.

In an embodiment, in the step 2, the epoxy curing agent is selected from the group consisting of a 4,4'-diaminodiphenylsulfone, a 4,4'-methylenedianiline, and a 3,3'-diethyl-4,4'-diaminodiphenylmethane.

In another aspect of the disclosure, the disclosure further provides a water-adaptive cement self-healing system prepared by the above-mentioned method.

In still another aspect of the disclosure, the disclosure further provides the application method of the water-adaptive cement self-healing system in cement self-healing, and the application method includes the following steps:

step 1, performing a water-absorbing treatment on the water-adaptive cement self-healing system for 1-10 min; and step 2, adding the water-adaptive cement self-healing system and water after the water-absorbing treatment in the step 1 into cement, where a mass ratio of the water-adaptive cement self-healing system after the water-absorbing treatment in the step 1 to the cement is 4.5-6: 94-95.5, and a water-cement ratio is 0.44.

During a self-healing process, the self-healing capsule is broken by an external force, the epoxy within the first oil phase as being the core material overflows, and then the epoxy reacts with the epoxy curing agent dispersed in the cement.

Compared with the related art, beneficial effects of the disclosure are as follows:

(1) After the self-healing capsule of the water-adaptive cement self-healing system of the disclosure absorbs water, the shell material of the capsule is transformed from brittleness to toughness, thereby maintaining a higher integrity and achieving a better self-healing performance in the cement mixing process. Compared with a traditional cement self-healing system, the cement self-healing system of the disclosure has various characteristics, such as water adaptability and capability of resisting stronger shear damage.

(2) Experiments prove that the water-adaptive cement self-healing system provided by the disclosure has a better capability of water absorption, i.e., the water absorption rate of the self-healing capsule reaches 81.02% within 10 minutes, the shell material of the capsule is rapidly subjected to brittleness-to-toughness transition, and the volume of the capsule shell material is expanded to block tiny cracks, which enhances the cement self-healing effect.

(3) Compared with a blank cement system, the water-adaptive cement self-healing system of the disclosure significantly improves the self-healing capability, and its maximum self-healing rate reaches 83.52%.

(4) The preparation method of the disclosure is based on the oil/water/oil double emulsion template, which is capable of reacting at room temperature, low in cost, and easy to implement industrialization.

DETAILED DESCRIPTION OF EMBODIMENTS

The disclosure will be further described in detail below with reference to specific embodiments. It should be understood that the specific embodiments described herein are merely used to explain the disclosure and are not intended to limit the disclosure.

Oil well cement (produced by Sichuan Jiahua Enterprise Co., Ltd) used in the following embodiments is not limited to the disclosure, and oil well cement produced by other enterprises can also be used in the disclosure.

Comparative Embodiment

Construction of a blank cement system includes adding running water into the oil well cement to prepare a cement slurry, preparing the cement slurry according to a national standard of GB/T 19139-2012, and maintaining the cement slurry in a curing box at 60 degrees Celsius (° C.)±2° C. for 1 day; and a water-cement ratio (also referred to a ratio of the running water to the oil well cement) is 0.44.

Embodiment 1

A method for preparing a water-adaptive cement self-healing system includes the following steps 1 and 2.

Step 1 of preparation of a self-healing capsule, includes the following steps A1 to A6:
- step A1, preparation of an aqueous phase: adding a disodium calcium ethylenediaminetetraacetate, a nano-silica, and a sodium alginate into deionized water, and uniformly stirring to obtain the aqueous phase with a mass fraction of the disodium calcium ethylenediaminetetraacetate of 37.4%, a mass fraction of the nano-silica of 8.0%, and a mass fraction of the sodium alginate of 2.0%;
- step A2, preparation of a first oil phase: adding a benzyl glycidyl ether to an epoxy, and uniformly stirring to obtain the first oil phase with a mass fraction of the benzyl glycidyl ether of 20%;
- step A3, preparation of an oil/water emulsion (also referred to oil-in-water emulsion): mixing the aqueous phase prepared in the step A1 and the first oil phase obtained in the step A2 according to a volume ratio of 80:20 to obtain a first mixture, and stirring the first mixture at 12,000 revolutions per minute (rpm) to obtain the uniform oil/water emulsion;
- step A4, preparation of a second oil phase: adding a span 80 into paraffin oil, and uniformly stirring to obtain the second oil phase with a mass fraction of the span 80 of 62.5%;
- step A5, preparation of an oil/water/oil emulsion: mixing the second oil phase obtained in the step A4 and the oil/water emulsion obtained in the step A3 according to a volume ratio of 75:25 to obtain a second mixture, and stirring the second mixture at 800 rpm to obtain the uniform oil/water/oil emulsion; and
- step A6, preparation of the self-healing capsule: dropwise adding glacial acetic acid into the oil/water/oil emulsion obtained in the step A5 to obtain a mixed solution, stirring the mixed solution until the mixed solution is shaped to obtain a solid, centrifuging the solid, and then washing the centrifuged solid with deionized water, followed by freeze-drying the washed solid to obtain the self-healing capsule.

Step 2, a 4,4'-diaminodiphenylsulfone is mixed with the self-healing capsule prepared in the step 1 according to a mass ratio of 0.5:1 to obtain the water-adaptive cement self-healing system based on an oil/water/oil double-emulsion template.

Furthermore, the water-adaptive cement self-healing system absorbs water for 10 min, and then the water-adaptive cement self-healing system after absorbing water and running water are together added into G-grade oil well cement to prepare a cement slurry according to the national standard of GB/T 19139-2012, and the cement slurry is maintained in a curing box at 60° C.±2° C. for 1 day; a mass ratio of the water-adaptive cement self-healing system in the embodiment 1 to the G-grade oil well cement is 4.5:95.5, and a water-cement ratio is 0.44.

Embodiment 2

A method for preparing a water-adaptive cement self-healing system includes the following steps 1 and 2.

Step 1 of preparation of a self-healing capsule, includes the following steps A1 to A6:
- step A1, preparation of an aqueous phase: adding a disodium calcium ethylenediaminetetraacetate, a nano-silica, and a sodium alginate into deionized water, and uniformly stirring to obtain the aqueous phase with a mass fraction of the disodium calcium ethylenediaminetetraacetate of 37.4%, a mass fraction of the nano-silica of 8.0%, and a mass fraction of the sodium alginate of 2.0%;
- step A2, preparation of a first oil phase: adding a benzyl glycidyl ether to an epoxy, and uniformly stirring to obtain the first oil phase with a mass fraction of the benzyl glycidyl ether of 20%;
- step A3, preparation of an oil/water emulsion: mixing the aqueous phase prepared in the step A1 and the first oil phase obtained in the step A2 according to a volume ratio of 80:20 to obtain a first mixture, and stirring the first mixture at 12,000 rpm to obtain the uniform oil/water emulsion;
- step A4, preparation of a second oil phase: adding a span 80 into paraffin oil, and uniformly stirring to obtain the second oil phase with a mass fraction of the span 80 of 62.5%;
- step A5, preparation of an oil/water/oil emulsion: mixing the second oil phase obtained in the step A4 and the oil/water emulsion obtained in the step A3 according to a volume ratio of 75:25 to obtain a second mixture, and stirring the second mixture at 800 rpm to obtain the uniform oil/water/oil emulsion; and
- step A6, preparation of the self-healing capsule: dropwise adding glacial acetic acid into the oil/water/oil emulsion obtained in the step A5 to obtain a mixed solution, stirring the mixed solution until the mixed solution is shaped to obtain a solid, centrifuging the solid, and then washing the centrifuged solid with deionized water, followed by freeze-drying the washed solid to obtain the self-healing capsule.

Step 2, a 4,4'-diaminodiphenylsulfone is mixed with the self-healing capsule prepared in the step 1 according to a mass ratio of 0.5:1 to obtain the water-adaptive cement self-healing system based on an oil/water/oil double-emulsion template.

Furthermore, the water-adaptive cement self-healing system absorbs water for 1 min, and then the water-adaptive cement self-healing system after absorbing water and running water are together added into G-grade oil well cement to prepare a cement slurry according to the national standard of GB/T 19139-2012, and the cement slurry is maintained in a curing box at 60° C.±2° C. for 1 day; a mass ratio of the water-adaptive cement self-healing system in the embodiment 2 to the G-grade oil well cement is 4.5:95.5, and a water-cement ratio is 0.44.

Embodiment 3

A method for preparing a water-adaptive cement self-healing system includes the following steps 1 and 2.

Step 1 of preparation of a self-healing capsule, includes the following steps A1 to A6:
- step A1, preparation of an aqueous phase: adding a disodium calcium ethylenediaminetetraacetate, a nano-silica, and a sodium alginate into deionized water, and uniformly stirring to obtain the aqueous phase with a mass fraction of the disodium calcium ethylenediaminetetraacetate of 37.4%, a mass fraction of the nano-silica of 8.0%, and a mass fraction of the sodium alginate of 2.0%;
- step A2, preparation of a first oil phase: adding a benzyl glycidyl ether to an epoxy, and uniformly stirring to obtain the first oil phase with a mass fraction of the benzyl glycidyl ether of 20%;
- step A3, preparation of an oil/water emulsion: mixing the aqueous phase prepared in the step A1 and the first oil phase obtained in the step A2 according to a volume ratio of 80:20 to obtain a first mixture, and stirring the first mixture at 12,000 rpm to obtain the uniform oil/water emulsion;
- step A4, preparation of a second oil phase: adding a span 80 into paraffin oil, and uniformly stirring to obtain the second oil phase with a mass fraction of the span 80 of 62.5%;
- step A5, preparation of an oil/water/oil emulsion: mixing the second oil phase obtained in the step A4 and the oil/water emulsion obtained in the step A3 according to a volume ratio of 75:25 to obtain a second mixture, and stirring the second mixture at 800 rpm to obtain the uniform oil/water/oil emulsion; and
- step A6, preparation of the self-healing capsule: dropwise adding glacial acetic acid into the oil/water/oil emulsion obtained in the step A5 to obtain a mixed solution, stirring the mixed solution until the mixed solution is shaped to obtain a solid, centrifuging the solid, and then washing the centrifuged solid with deionized water, followed by freeze-drying the washed solid to obtain the self-healing capsule.

Step 2, a 4,4'-diaminodiphenylsulfone is mixed with the self-healing capsule prepared in the step 1 according to a mass ratio of 0.5:1 to obtain the water-adaptive cement self-healing system.

Furthermore, the water-adaptive cement self-healing system and running water are directly added into G-grade oil well cement to prepare a cement slurry according to the national standard of GB/T 19139-2012, and the cement slurry is maintained in a curing box at 60° C.±2° C. for 1 day; a mass ratio of the water-adaptive cement self-healing system in the embodiment 3 to the G-grade oil well cement is 4.5:95.5, and a water-cement ratio is 0.44.

Embodiment 4

A method for preparing a water-adaptive cement self-healing system includes the following steps 1 and 2.

Step 1 of preparation of a self-healing capsule, includes the following steps A1 to A6:
- step A1, preparation of an aqueous phase: adding a calcium carbonate, a bentonite, and a sodium alginate into deionized water, and uniformly stirring to obtain the aqueous phase with a mass fraction of the calcium carbonate of 18.7%, a mass fraction of the bentonite of 2.0%, and a mass fraction of the sodium alginate of 0.5%;
- step A2, preparation of a first oil phase: adding a trimethylolpropane triglycidyl ether to an epoxy, and uniformly stirring to obtain the first oil phase with a mass fraction of the trimethylolpropane triglycidyl ether of 10%;
- step A3, preparation of an oil/water emulsion: mixing the aqueous phase prepared in the step A1 and the first oil phase obtained in the step A2 according to a volume ratio of 50:50 to obtain a first mixture, and stirring the first mixture at 10,000 rpm to obtain the uniform oil/water emulsion;
- step A4, preparation of a second oil phase: adding a polysorbate 20 into paraffin oil, and uniformly stirring to obtain the second oil phase with a mass fraction of the polysorbate 20 of 50%;
- step A5, preparation of an oil/water/oil emulsion: mixing the second oil phase obtained in the step A4 and the oil/water emulsion obtained in the step A3 according to a volume ratio of 80:20 to obtain a second mixture, and stirring the second mixture at 600 rpm to obtain the uniform oil/water/oil emulsion; and
- step A6, preparation of the self-healing capsule: dropwise adding diluted hydrochloric acid into the oil/water/oil emulsion obtained in the step A5 to obtain a mixed solution, stirring the mixed solution until the mixed solution is shaped to obtain a solid, centrifuging the solid, and then washing the centrifuged solid with deionized water, followed by freeze-drying the washed solid to obtain the self-healing capsule.

Step 2, a 4,4'-methylenedianiline is mixed with the self-healing capsule prepared in the step 1 according to a mass ratio of 1:1 to obtain the water-adaptive cement self-healing system.

Furthermore, the water-adaptive cement self-healing system absorbs water for 10 min, and then the water-adaptive cement self-healing system after absorbing water and running water are together added into G-grade oil well cement to prepare a cement slurry according to the national standard of GB/T 19139-2012, and the cement slurry is maintained in a curing box at 60° C.±2° C. for 1 day; a mass ratio of the water-adaptive cement self-healing system in the embodiment 4 to the G-grade oil well cement is 6:94, and a water-cement ratio is 0.44.

Embodiment 5

A method for preparing a water-adaptive cement self-healing system includes the following steps 1 and 2.

Step 1 of preparation of a self-healing capsule, includes the following steps A1 to A6:
- step A1, preparation of an aqueous phase: adding an aluminum hydroxide, a calcium silicate, and a xanthan gum into deionized water, and uniformly stirring to obtain the aqueous phase with a mass fraction of the aluminum hydroxide of 20%, a mass fraction of the calcium silicate of 4.0%, and a mass fraction of the xanthan gum of 1.0%;

step A2, preparation of a first oil phase: adding a 1,4-butanediol diglycidyl ether to an epoxy, and uniformly stirring to obtain the first oil phase with a mass fraction of the 1,4-butanediol diglycidyl ether of 15%;

step A3, preparation of an oil/water emulsion: mixing the aqueous phase prepared in the step A1 and the first oil phase obtained in the step A2 according to a volume ratio of 75:25 to obtain a first mixture, and stirring the first mixture at 11,000 rpm to obtain the uniform oil/water emulsion;

step A4, preparation of a second oil phase: adding an op-10 surfactant into paraffin oil, and uniformly stirring to obtain the second oil phase with a mass fraction of the op-10 surfactant of 60%;

step A5, preparation of an oil/water/oil emulsion: mixing the second oil phase obtained in the step A4 and the oil/water emulsion obtained in the step A3 according to a volume ratio of 75:25 to obtain a second mixture, and stirring the second mixture at 700 rpm to obtain the uniform oil/water/oil emulsion; and step A6, preparation of the self-healing capsule: dropwise adding diluted sulfuric acid into the oil/water/oil emulsion obtained in the step A5 to obtain a mixed solution, stirring the mixed solution until the mixed solution is shaped to obtain a solid, centrifuging the solid, and then washing the centrifuged solid with deionized water, followed by freeze-drying the washed solid to obtain the self-healing capsule.

Step 2, a 3,3'-diethyl-4,4'-diaminodiphenylmethane is mixed with the self-healing capsule prepared in the step 1 according to a mass ratio of 0.75:1 to obtain the water-adaptive cement self-healing system.

Furthermore, the water-adaptive cement self-healing system absorbs water for 10 min, and then the water-adaptive cement self-healing system after absorbing water and running water are together added into G-grade oil well cement to prepare a cement slurry according to the national standard of GB/T 19139-2012, and the cement slurry is maintained in a curing box at 60° C.±2° C. for 1 day; a mass ratio of the water-adaptive cement self-healing system in the embodiment to the G-grade oil well cement is 5.25:94.75, and a water-cement ratio is 0.44.

FIGS. 1A-1G illustrate scanning electron microscope diagrams, X-ray energy spectrum analysis diagrams, and a particle size distribution map of the self-healing capsule of the water-adaptive cement self-healing system prepared from the embodiment 1. As can be seen from FIG. 1A and FIG. 1B, the self-healing capsule of the water-adaptive cement self-healing system is a sphere with a rough surface, and a large number of protrusions exist on the surface of the self-healing capsule. As can be seen from FIG. 1C to FIG. 1F, the self-healing capsule of the water-adaptive cement self-healing system is mainly composed of a silicon element (Si), an oxygen element (O), a carbon element (C), and a calcium element (Ca); Si is distributed at the protrusions, which are mainly composed of silicon dioxide; and Ca is mainly distributed on the surface of the self-healing capsule, indicating that the self-healing capsule is mainly composed of the calcium alginate. As can be seen from FIG. 1G, the self-healing capsule of the water-adaptive cement self-healing system has an average particle size of about 26.70 micrometers (μm), and a circulation volume (CV, also referred to a variable coefficient) is 6.8%.

Figure 1A:
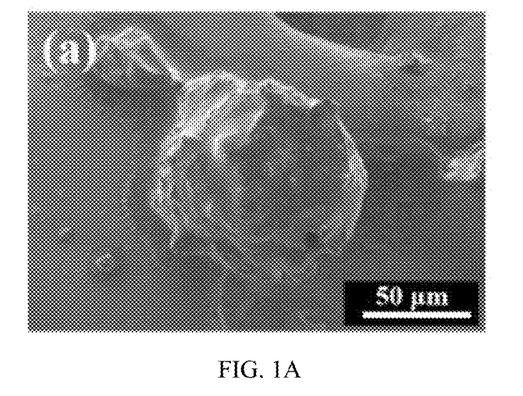
FIG. 1A illustrates a surface morphology of a self-healing capsule of a water-adaptive cement self-healing system prepared in an embodiment 1.
Figure 1B:
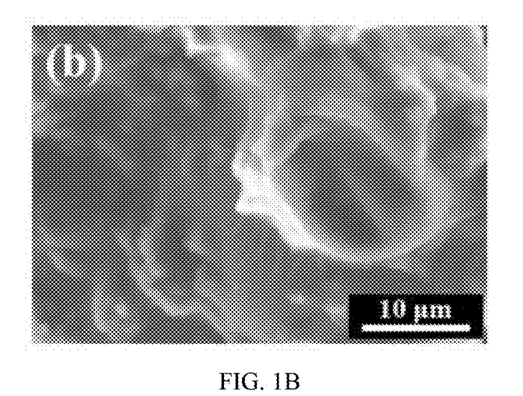
FIG. 1B illustrates a partial enlarged diagram of a surface of the self-healing capsule of the water-adaptive cement self-healing system prepared in the embodiment 1.
Figure 1C:
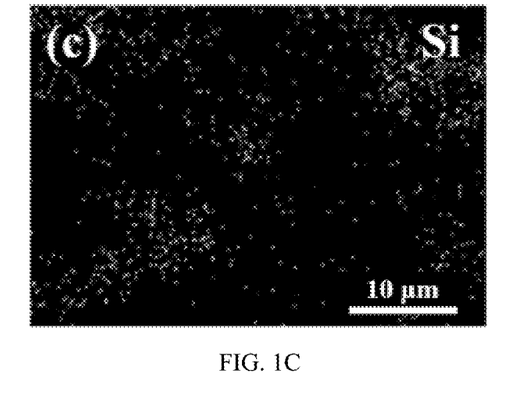
FIG. 1C illustrates a distribution map of a silicon element (Si) in the self-healing capsule of the water-adaptive cement self-healing system prepared in the embodiment 1.
Figure 1D:
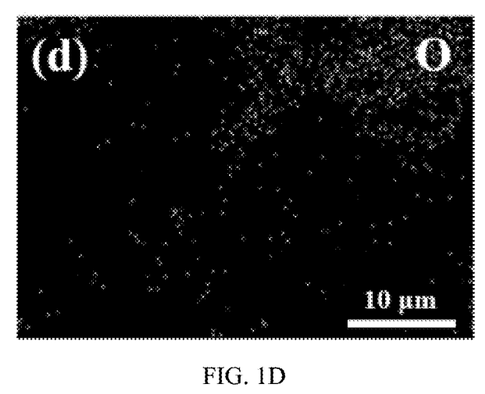
FIG. 1D illustrates a distribution map of an oxygen element (O) in the self-healing capsule of the water-adaptive cement self-healing system prepared in the embodiment 1.
Figure 1E:
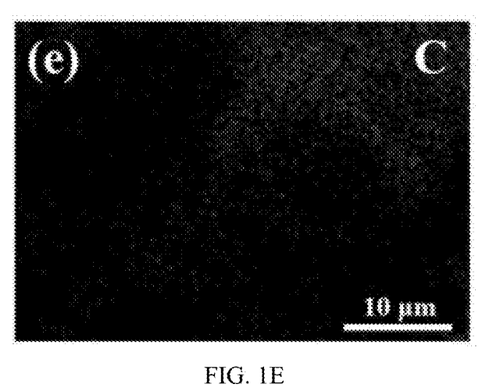
FIG. 1E illustrates a distribution map of a carbon element (C) in the self-healing capsule of the water-adaptive cement self-healing system prepared in the embodiment 1.
Figure 1F:
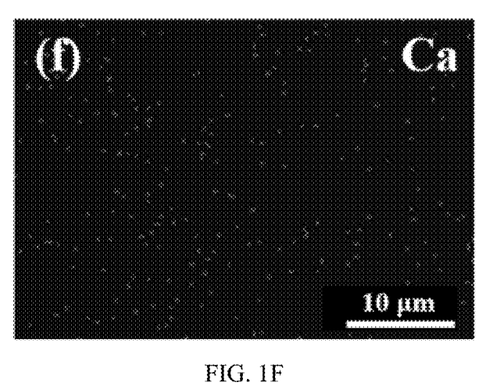
FIG. 1F illustrates a distribution map of a calcium element (Ca) in the self-healing capsule of the water-adaptive cement self-healing system prepared in the embodiment 1.
Figure 1G:
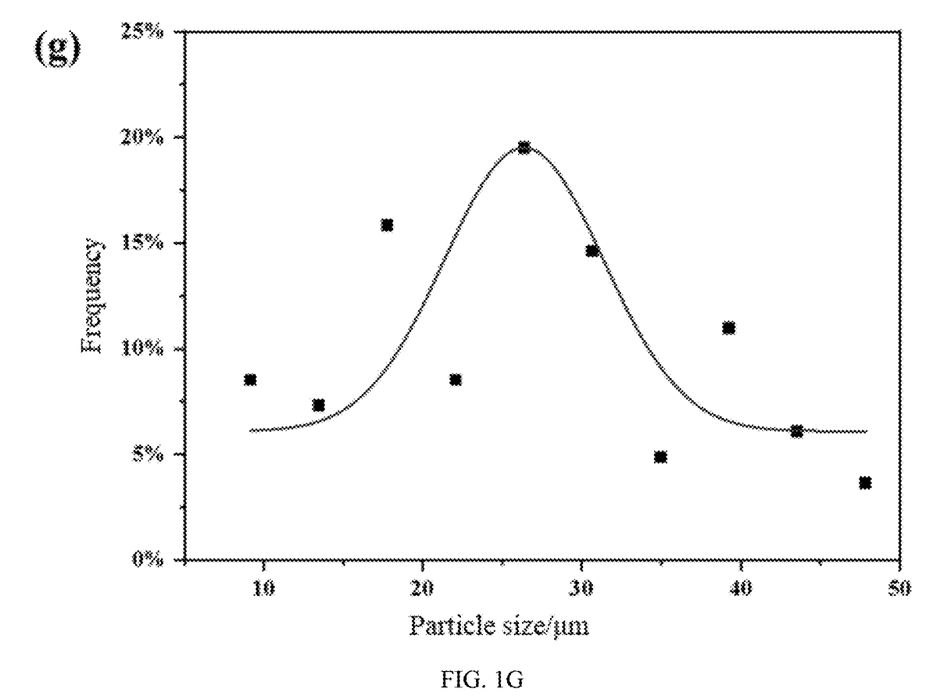
FIG. 1G illustrates a particle size distribution map of the self-healing capsule of the water-adaptive cement self-healing system prepared in the embodiment 1.
Figure 2:
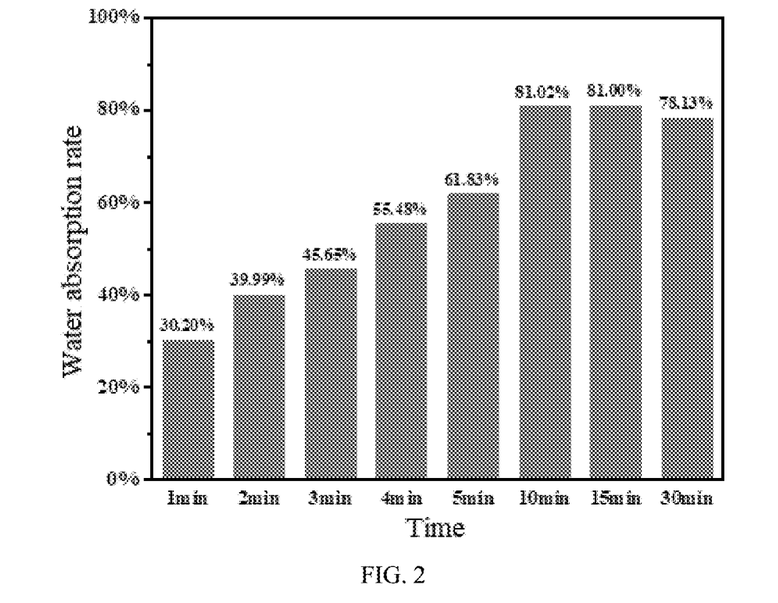
FIG. 2 illustrates a test diagram of a water absorption rate of a self-healing capsule of a water-adaptive cement self-healing system according to an embodiment of the disclosure.
Figure 3A:
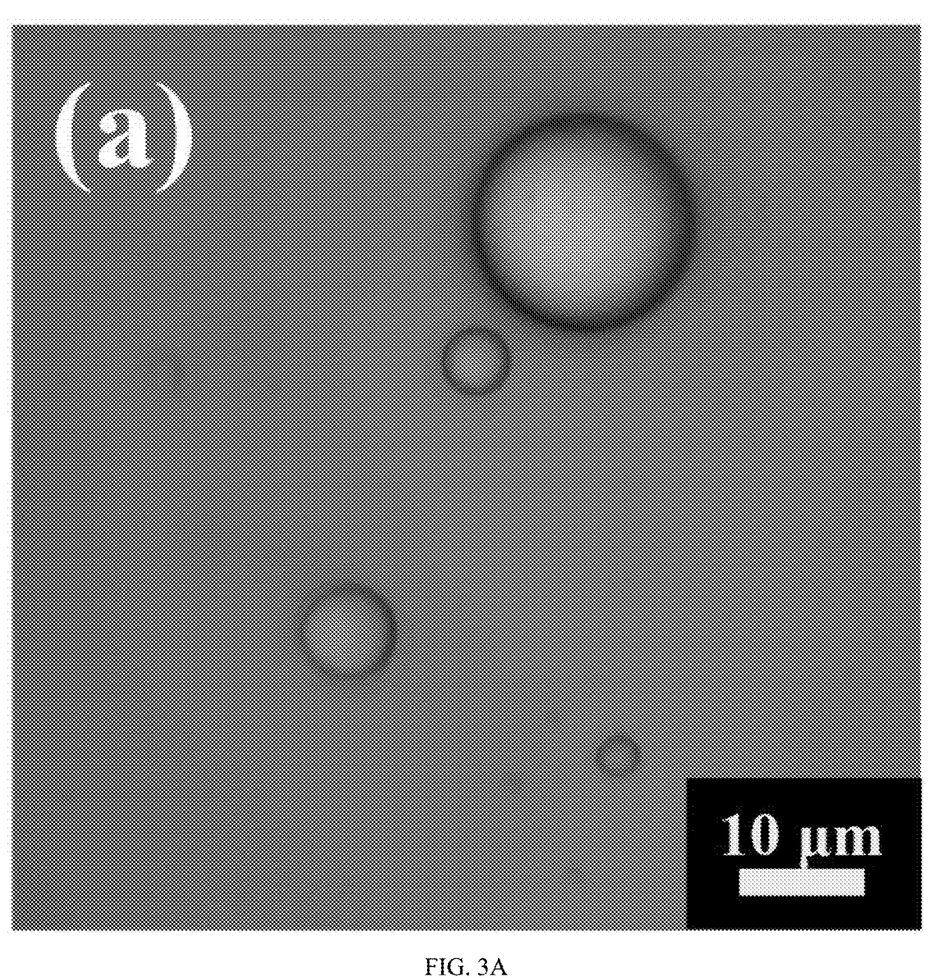
FIG. 3A illustrates a laser scanning confocal microscope image of a self-healing capsule of a water-adaptive cement self-healing system before high-speed stirring.
Figure 3B:
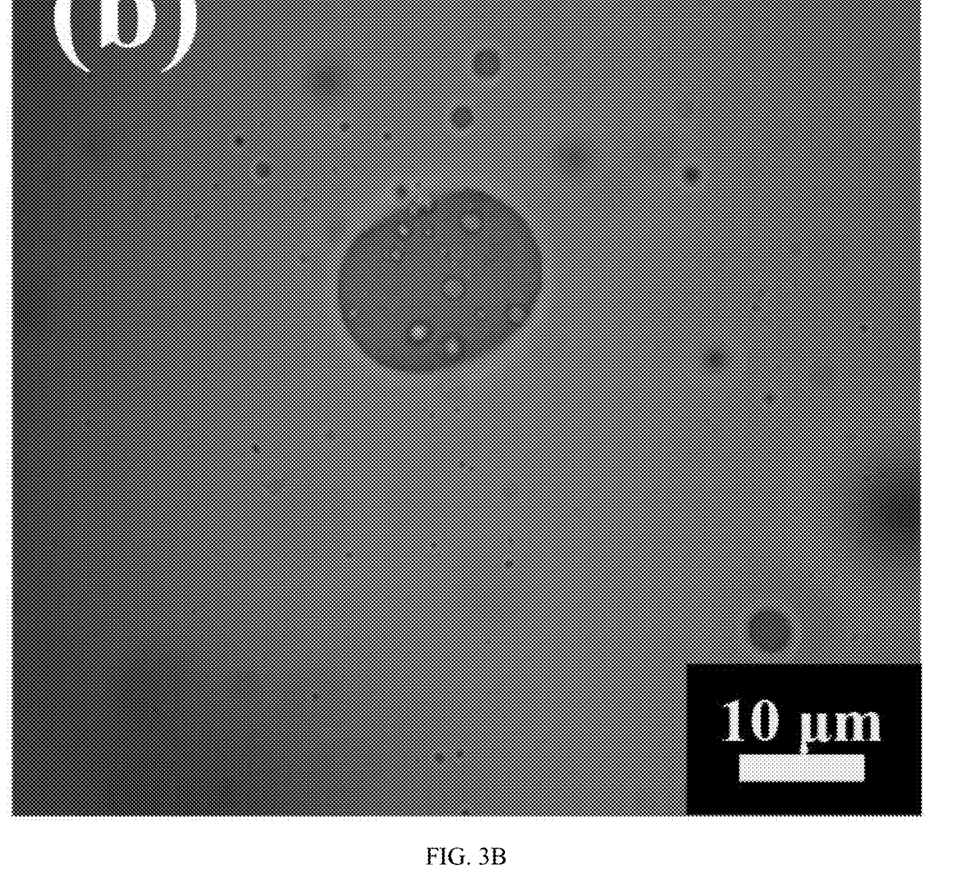
FIG. 3B illustrates a laser scanning confocal microscope image of a dried self-healing capsule of the water-adaptive cement self-healing system after the high-speed stirring.
Figure 3C:
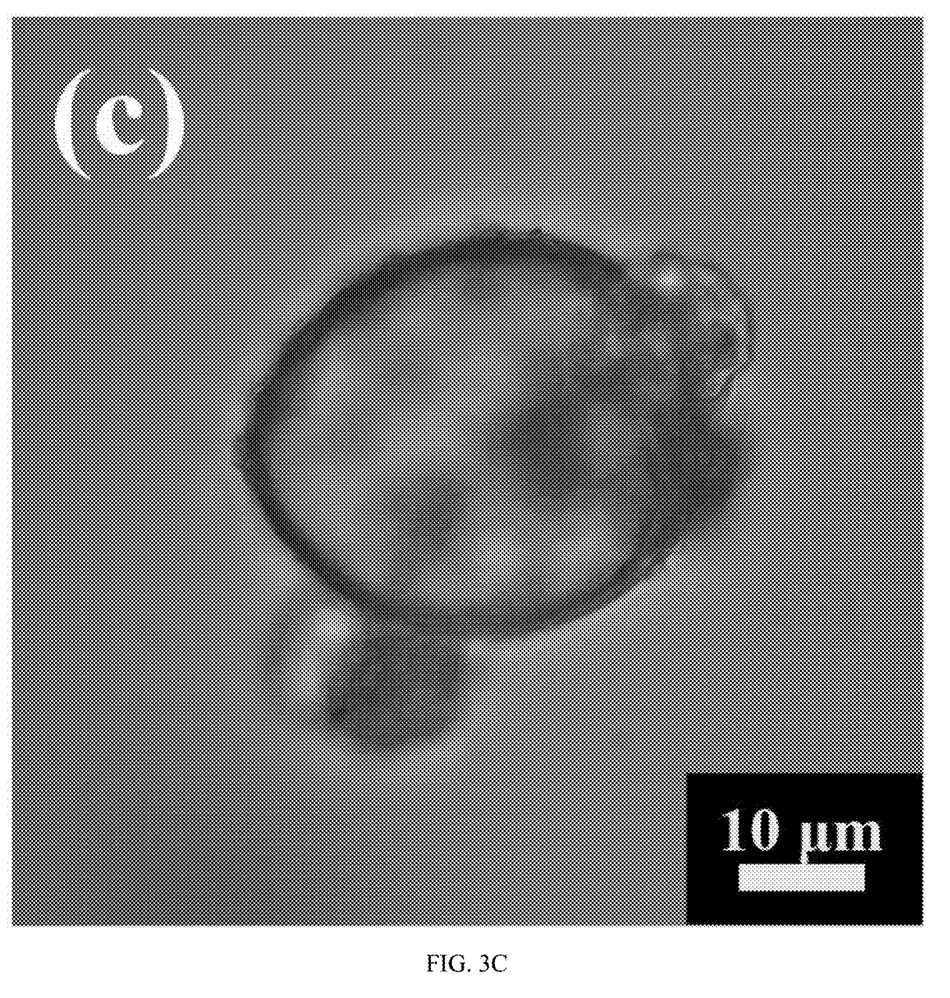
FIG. 3C illustrates a laser scanning confocal microscope image of the self-healing capsule that absorbs water for 1 min after the high-speed stirring.
Figure 3D:
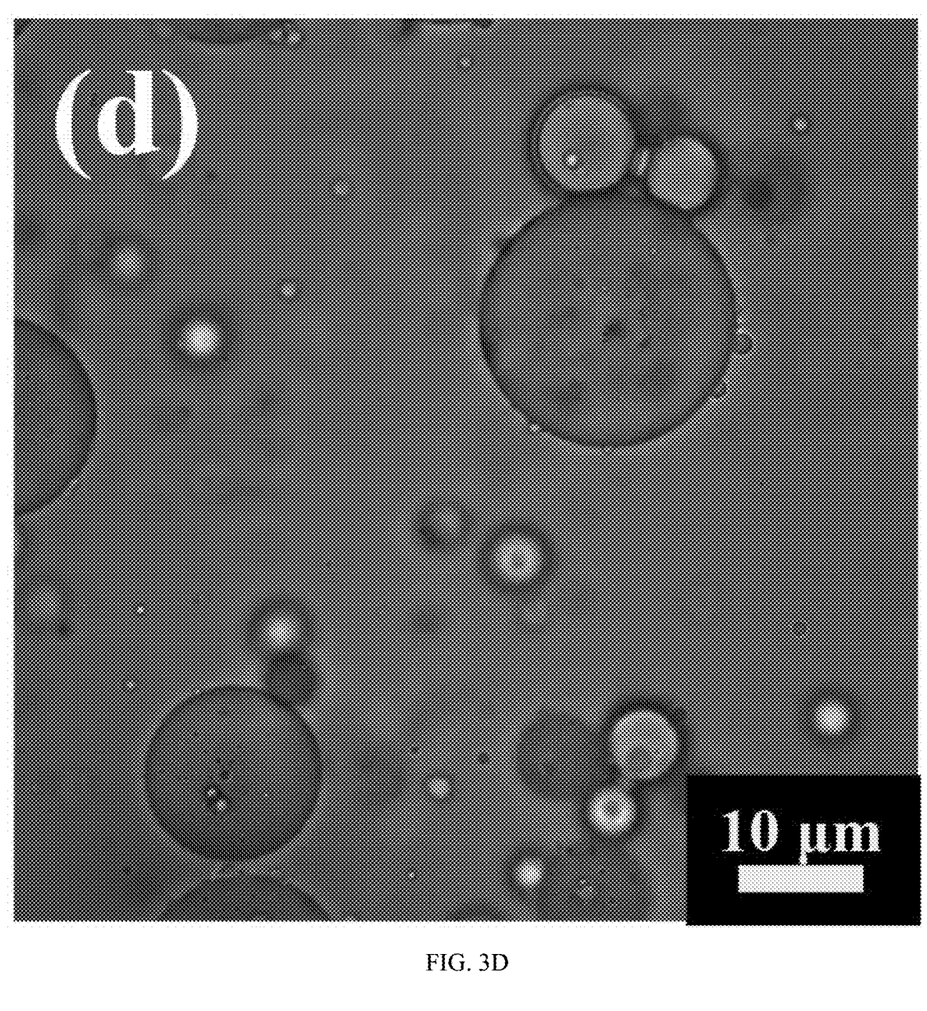
FIG. 3D illustrates a laser scanning confocal microscope image of the self-healing capsule that absorbs water for 10 min after the high-speed stirring.
Figure 3E:
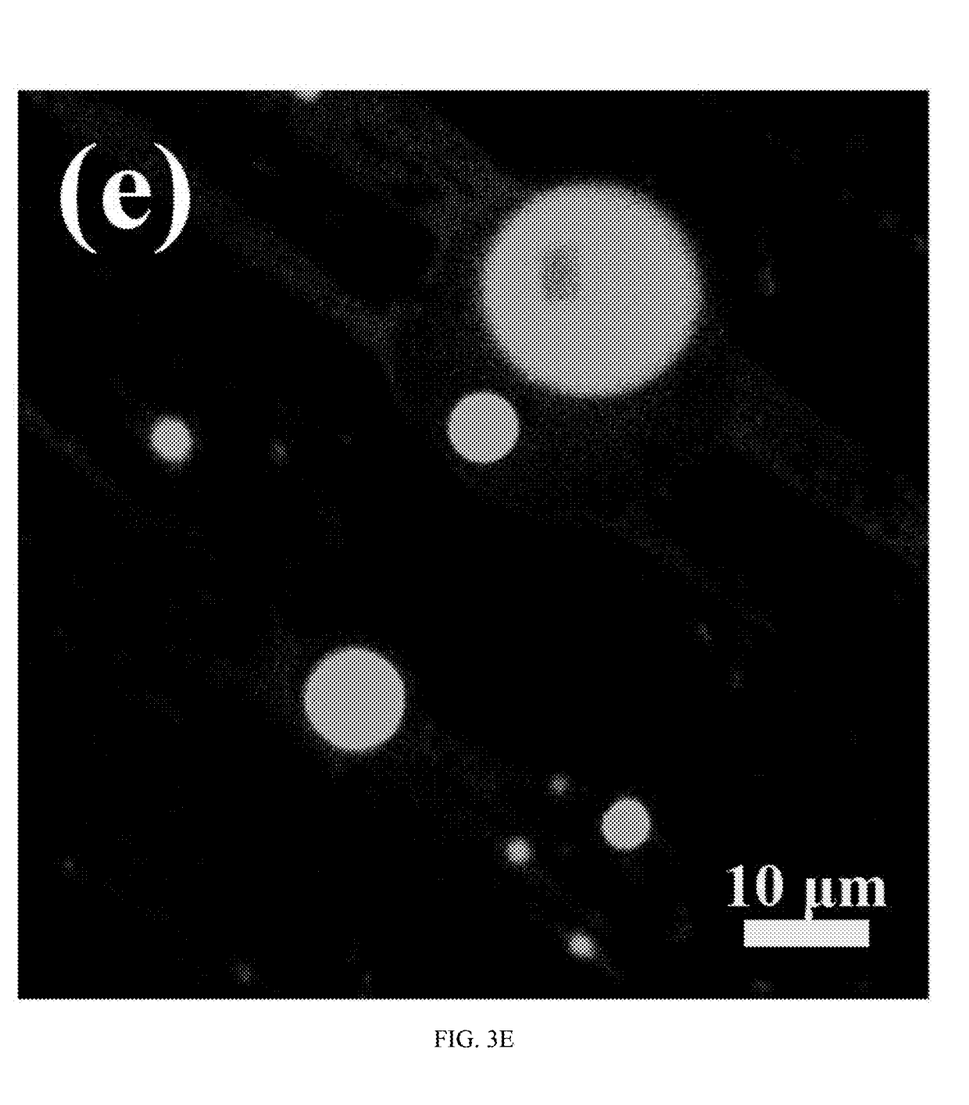
FIG. 3E illustrates a fluorescent diagram corresponding to the laser scanning confocal microscope image illustrated in FIG. 3A.
Figure 3F:
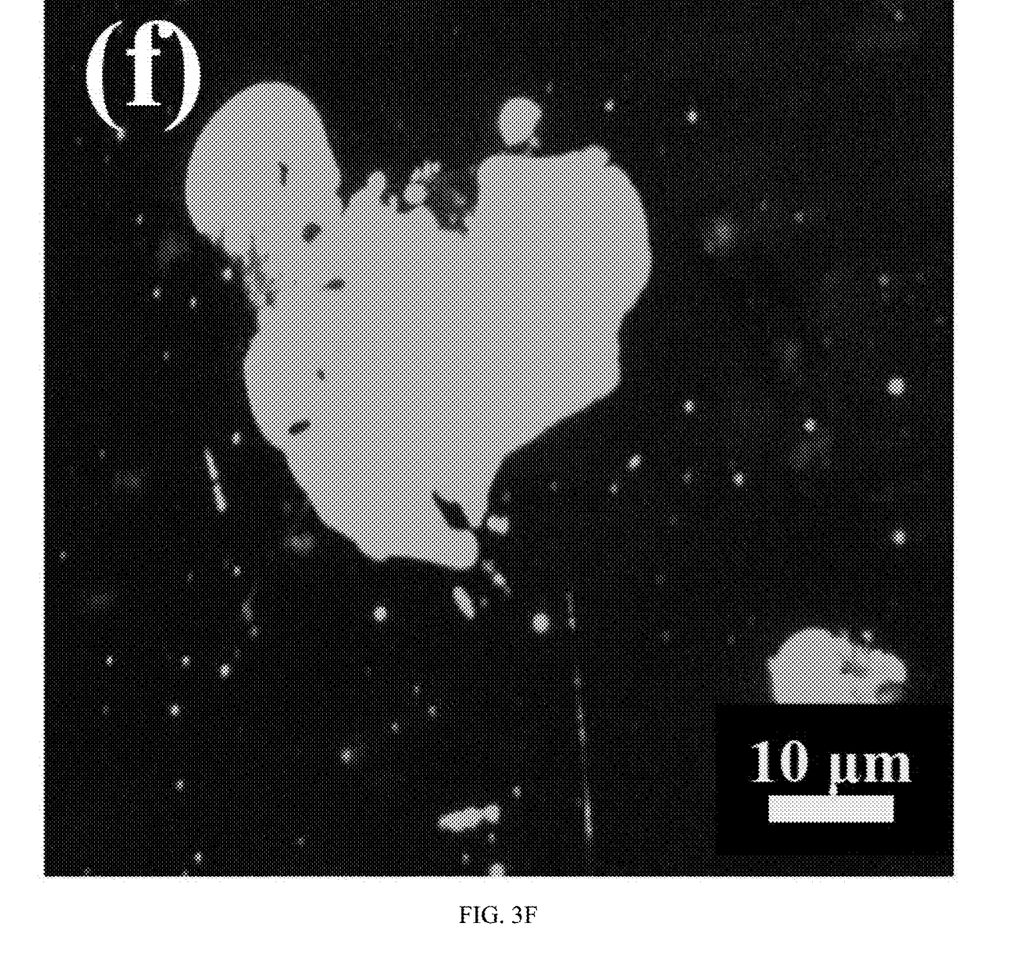
FIG. 3F illustrates a fluorescent diagram corresponding to the laser scanning confocal microscope image illustrated in FIG. 3B.
Figure 3G:
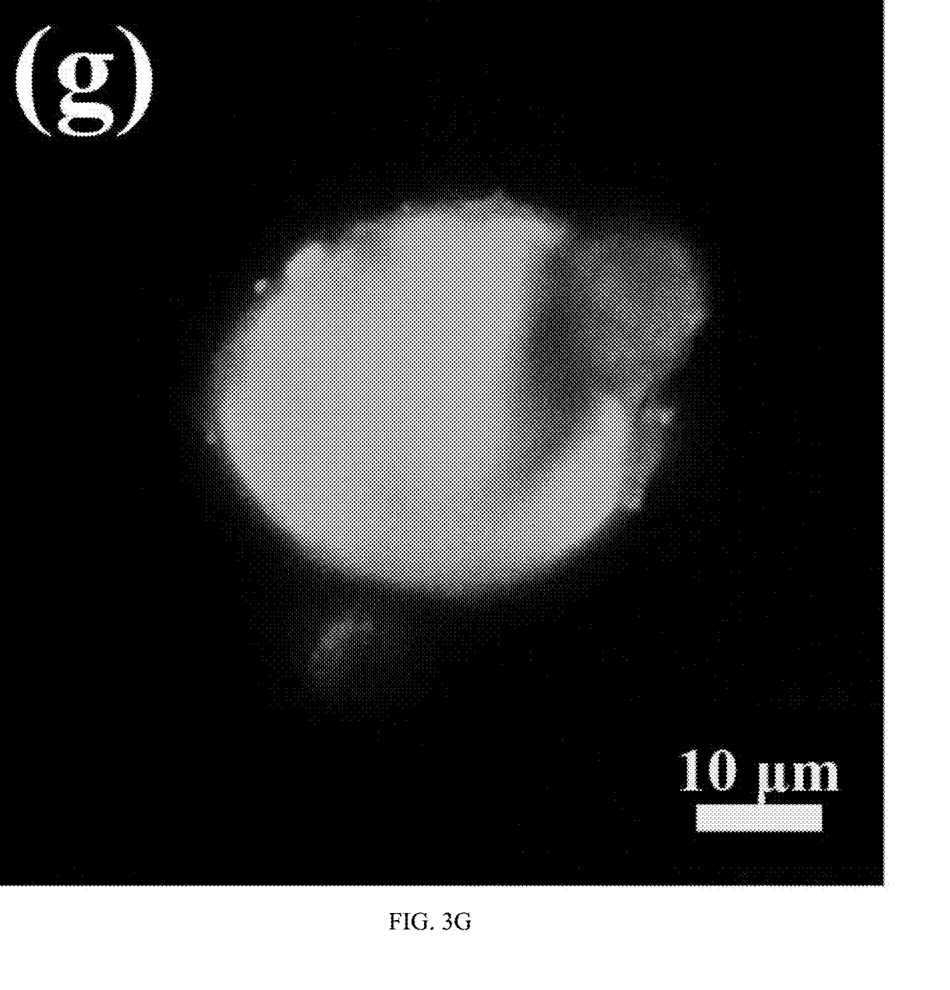
FIG. 3G illustrates a fluorescent diagram corresponding to the laser scanning confocal microscope image illustrated in FIG. 3C.
Figure 3H:
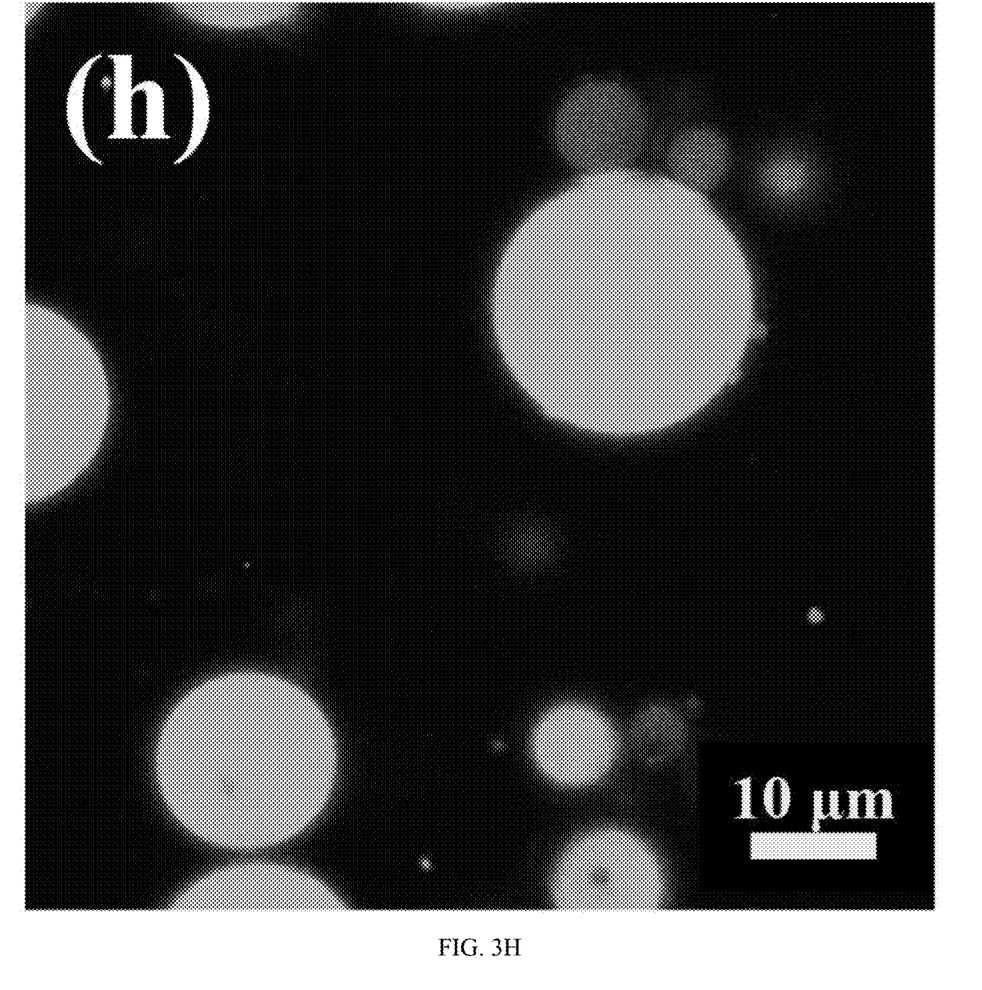
FIG. 3H illustrates a fluorescent diagram corresponding to the laser scanning confocal microscope image illustrated in FIG. 3D.

FIG. 2 illustrates a test diagram of a water absorption rate of the self-healing capsule of the water-adaptive cement self-healing system. It can be seen from FIG. 2 that the water absorption rate of the self-healing capsule of the water-adaptive cement self-healing system is increased over time within 10 min, the water absorption rate is up to 81.02% when reaching 10 min, and then the water absorption rate is basically kept unchanged.

FIGS. 3A-3H illustrate laser scanning confocal microscope images and corresponding fluorescent diagrams of the self-healing capsule of the water-adaptive cement self-healing system before and after high-speed stirring. It can be seen from FIG. 3A and FIG. 3E that the self-healing capsule of the water-adaptive cement self-healing system remains a regular spherical structure before the high-speed stirring. It can be seen from FIG. 3B and FIG. 3F that the dried self-healing capsule is completely broken after the high-speed stirring, and the epoxy overflows. It can be seen from FIG. 3C and FIG. 3G that the self-healing capsule absorbing water for 1 min is partially broken and deformed after the high-speed stirring. And it can be seen from FIG. 3D and FIG. 3H that the self-healing capsule absorbing water for 10 min still remains the regular spherical structure after the high-speed stirring, has no cracks and does not leak the epoxy. The above phenomenon is due to that a flexibility of the shell material of the self-healing capsule is improved with an increase of the water absorption rate, and a thickness of the self-healing capsule is increased, thereby resisting shearing damage generated by the high-speed stirring in the cement mixing process, and making the self-healing capsule have excellent water self-adaptability.

Figure 4:
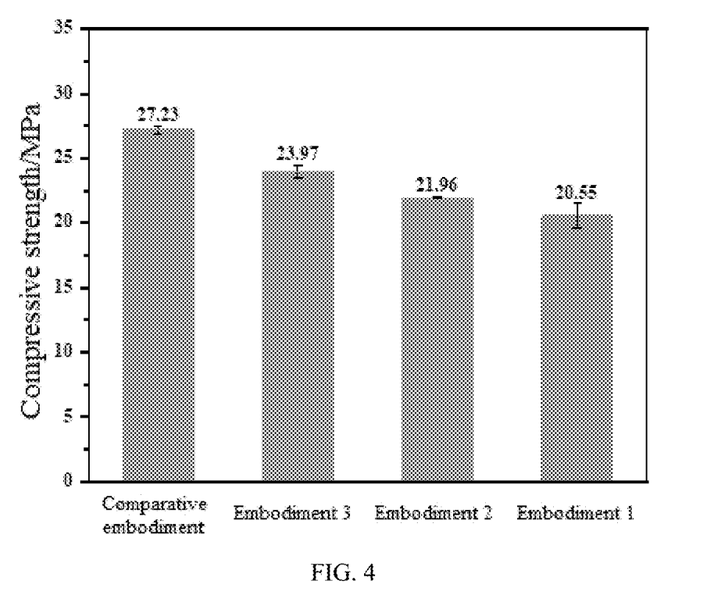
FIG. 4 illustrates a schematic diagram of compressive strengths of water-adaptive cement self-healing systems prepared in a comparative embodiment and embodiments with different water absorption rates (i.e., embodiment 1, embodiment 2, and embodiment 3).

FIG. 4 illustrates a schematic diagram of compressive strengths of water-adaptive cement self-healing systems prepared in a comparative embodiment and embodiments with different water absorption rates (i.e., embodiment 1, embodiment 2, and embodiment 3). It can be seen from FIG. 4 that the compressive strengths of the water-adaptive cement self-healing systems with different water absorption rates are lower than that of the comparative embodiment, because that the self-healing capsules increase internal defects of the cement. The compressive strength of the water-adaptive cement self-healing system is increased along with a reduction of the water absorption rate, which is due to the fact that the shell material of the self-healing capsule with a lower water absorption rate shows brittleness. Therefore, the self-healing capsule with the lower water absorption rate is easier to shear and crack in the slurry mixing process, causing the leakage of the epoxy in the self-healing capsule and then improving the compressive strength.

Figure 5:
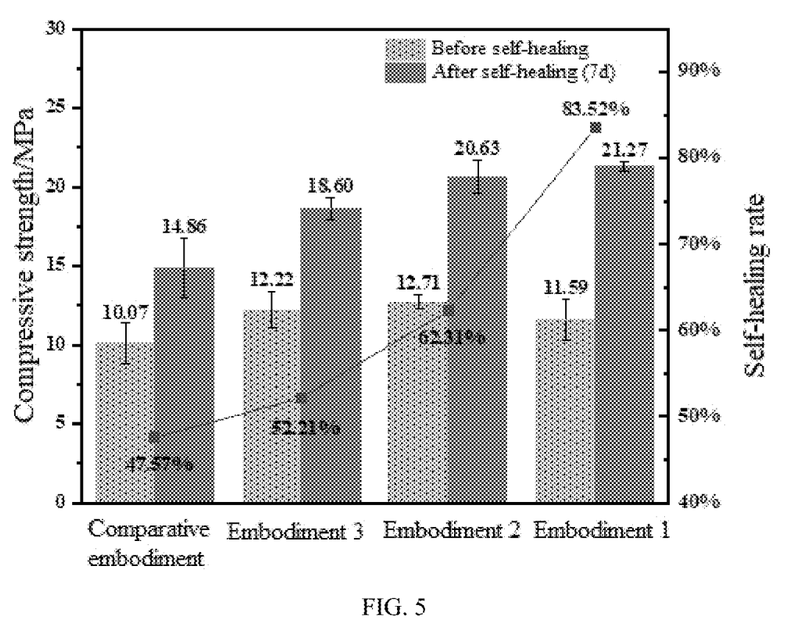
FIG. 5 illustrates a schematic diagram of compressive strengths and self-healing rates of the water-adaptive cement self-healing systems prepared in the comparative embodiment and the embodiments with different water absorption rates (i.e., embodiment 1, embodiment 2, and embodiment 3) before and after self-healing; a calculation formula for the self-healing is: $\eta=(\sigma2-\sigma1)/\sigma1$, at which $\eta$ represents the self-healing rate; $\sigma2$ represents a compressive strength after the self-healing; and $\sigma1$ represents a compressive strength before the self-healing.

FIG. 5 illustrates a schematic diagram of compressive strengths and self-healing rates of the water-adaptive cement self-healing systems prepared in the comparative embodiment and the embodiments with different water absorption rates (i.e., embodiment 1, embodiment 2, and embodiment 3) before and after self-healing. It can be seen from FIG. 5 that after 7 days of maintenance at 60° C., the self-healing rates of the water-adaptive cement self-healing systems with different water absorption rates are much higher than the self-healing rate of the comparative embodiment, which is due to that the addition of the self-healing system significantly improves the self-healing performance. The self-healing rate of the water-adaptive cement self-healing system increases with the increase of the water absorption rate, which is due to that the shell material of the self-healing capsule with the higher water absorption rate shows toughness. Therefore, the shell material of the self-healing capsule with the higher water absorption rate is not prone to being sheared and broken in the slurry mixing process, and the integrity of the self-healing capsule is higher. Furthermore, among the embodiments of the disclosure, the self-healing rate of the embodiment 1 is the highest, and reaches 83.52%.

The embodiments prove that the water absorption rates of the water-adaptive cement self-healing systems prepared in the embodiment 4 and the embodiment 5 are similar to the water absorption rate of the water-adaptive cement self-healing system prepared in the embodiment 1.

The water-adaptive cement self-healing system provided by the disclosure has remarkable self-healing capability, and effectively overcomes the defect that an existing cement self-healing system is easy to shear and crack in the slurry mixing process.

The above only illustrates the specific embodiments of the disclosure, and it should be noted that, for those skilled in the related art, several improvements and modifications can be made without departing from the principle of the disclosure, and these improvements and modifications should also be regarded as the protection scope of the disclosure.

What is claimed is:

1. A method for preparing a water-adaptive cement self-healing system, comprising the following steps:
    step 1, preparation of a self-healing capsule, comprising the following steps:
    step A1, preparation of an aqueous phase, comprising: adding a pH-triggered shell curing agent, an inorganic nano-emulsifier, and a polysaccharide shell material into deionized water, and then uniformly stirring to obtain the aqueous phase; wherein a mass fraction of the pH-triggered shell curing agent in the aqueous phase is 18.7%-37.4%, a mass fraction of the inorganic nano-emulsifier in the aqueous phase is 2.0%-8.0%, and a mass fraction of the polysaccharide shell material in the aqueous phase is 0.5%-2.0%; and the pH-triggered shell curing agent is a disodium calcium ethylenediaminetetraacetate, a calcium carbonate, or an aluminum hydroxide;
    step A2, preparation of a first oil phase, comprising: adding an active diluent to an epoxy, and then uniformly stirring to obtain the first oil phase; wherein a mass fraction of the active diluent in the first oil phase is 10%-20%;
    step A3, preparation of an oil/water emulsion, comprising: mixing the aqueous phase obtained in the step A1 and the first oil phase obtained in the step A2 according to a volume ratio of 80-50:20-50 to obtain a first mixture, and stirring the first mixture at 10,000-12,000 revolutions per minute (rpm) to obtain the oil/water emulsion;
    step A4, preparation of a second oil phase, comprising: adding a surfactant into paraffin oil, and then uniformly stirring to obtain the second oil phase; wherein a mass fraction of the surfactant in the second oil phase is 50%-62.5%;
    step A5, preparation of an oil/water/oil emulsion, comprising: mixing the second oil phase obtained in the step A4 and the oil/water emulsion obtained in the step A3 according to a volume ratio of 80-75:20-25 to obtain a second mixture, and stirring the second mixture at 600-800 rpm to obtain the oil/water/oil emulsion; and
    step A6, preparing the self-healing capsule, comprising: dropwise adding an acidic liquid into the oil/water/oil emulsion obtained in the step A5 to obtain a mixed solution, stirring the mixed solution until the mixed solution is shaped to obtain a solid, centrifuging the solid, and then washing the centrifuged solid with deionized water, followed by freeze-drying the washed solid to obtain the self-healing capsule; wherein the self-healing capsule is of a core-shell structure, a shell material of the core-shell structure is the aqueous phase prepared in the step A1, and a core material of the core-shell structure is the first oil phase prepared in the step A2; and
    step 2, mixing an epoxy curing agent with the self-healing capsule prepared in the step 1 according to a mass ratio of 0.5-1:1 to obtain the water-adaptive cement self-healing system based on an oil/water/oil double-emulsion template.

2. The method for preparing the water-adaptive cement self-healing system according to claim 1, wherein in the step A1, the inorganic nano-emulsifier is a nano-silica, a bentonite, or a calcium silicate.

3. The method for preparing the water-adaptive cement self-healing system according to claim 1, wherein in the step A1, the polysaccharide shell material is a sodium alginate or a xanthan gum.

4. The method for preparing the water-adaptive cement self-healing system according to claim 1, wherein in the step A2, the active diluent is a benzyl glycidyl ether, a trimethylolpropane triglycidyl ether, or a 1,4-butanediol diglycidyl ether.

5. The method for preparing the water-adaptive cement self-healing system according to claim 1, wherein in the step A4, the surfactant is a span 80, a polysorbate 20, or an op-10 surfactant.

6. The method for preparing the water-adaptive cement self-healing system according to claim 1, wherein in the step A6, the acidic liquid is glacial acetic acid, diluted hydrochloric acid, or diluted sulfuric acid.

7. The method for preparing the water-adaptive cement self-healing system according to claim 1, wherein in the step 2, the epoxy curing agent is a 4,4'-diaminodiphenylsulfone, a 4,4'-methylenedianiline, or a 3,3'-diethyl-4,4'-diaminodiphenylmethane.

* * * * *